May 14, 1968

H. N. SHOHET ET AL 3,383,078

AUXILIARY FLUID SYSTEM

Filed Dec. 23, 1964

INVENTORS
GEORGE J. PAULIS
HERBERT N. SHOHET

BY Vernon F. Hauschild

ATTORNEY

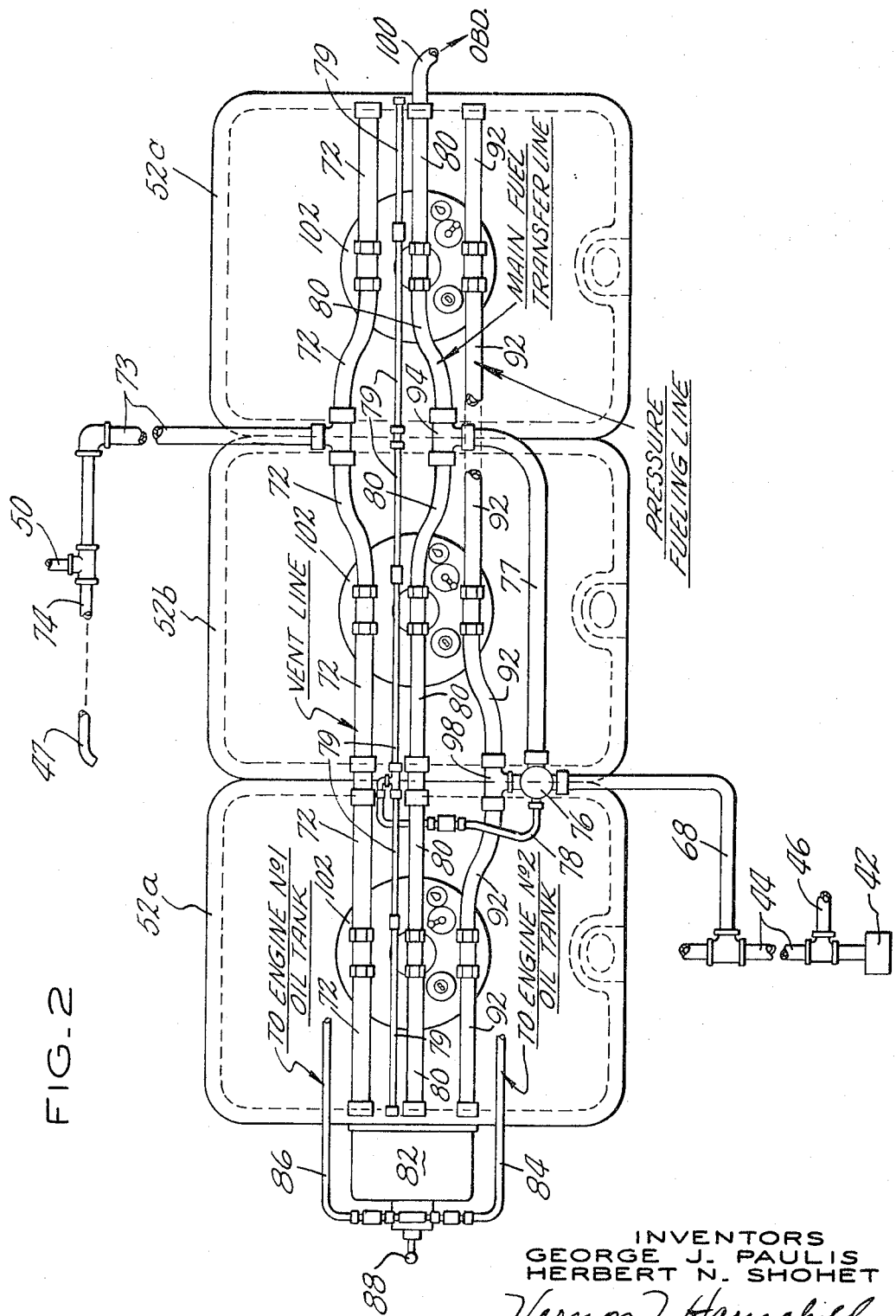

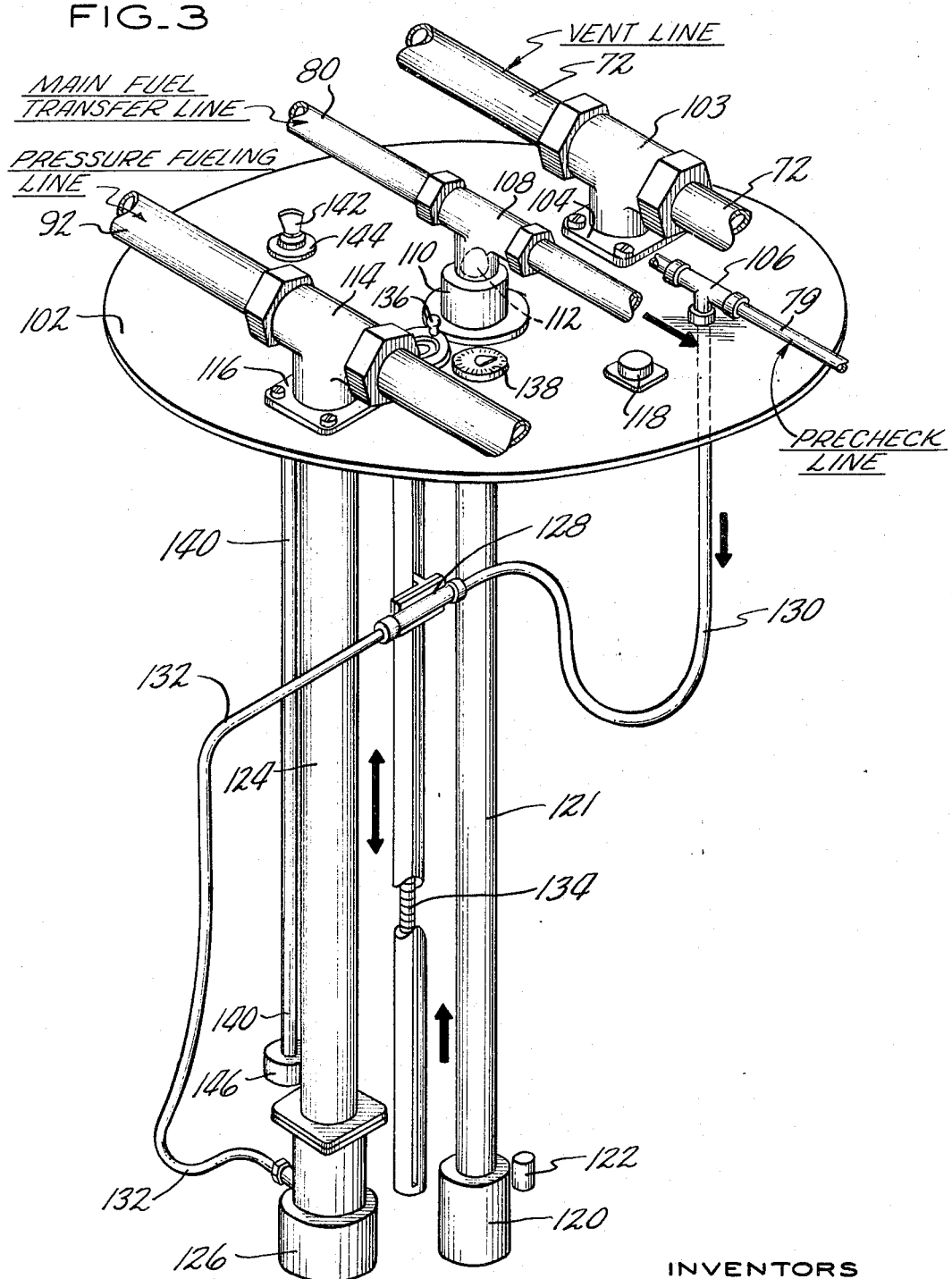

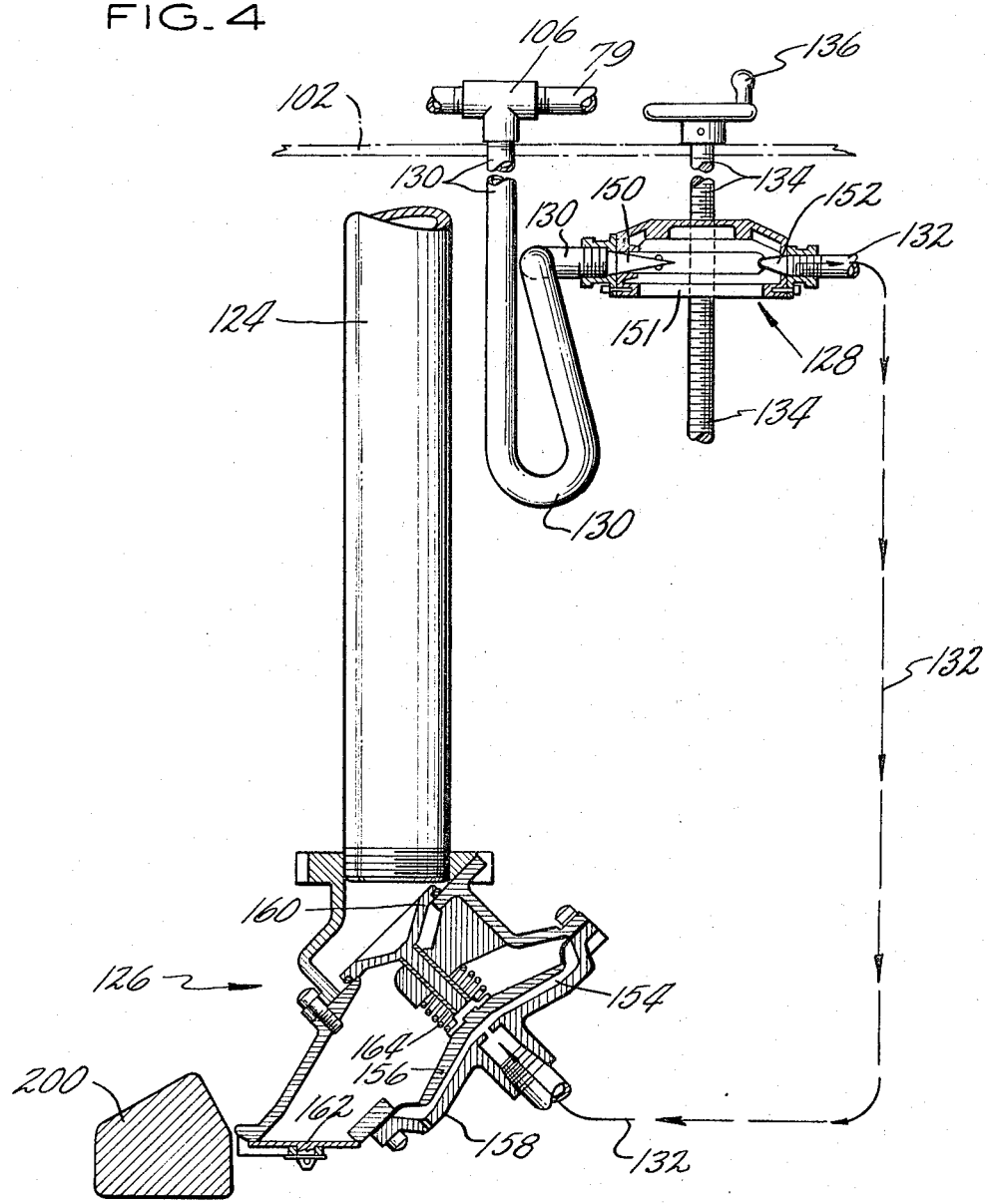

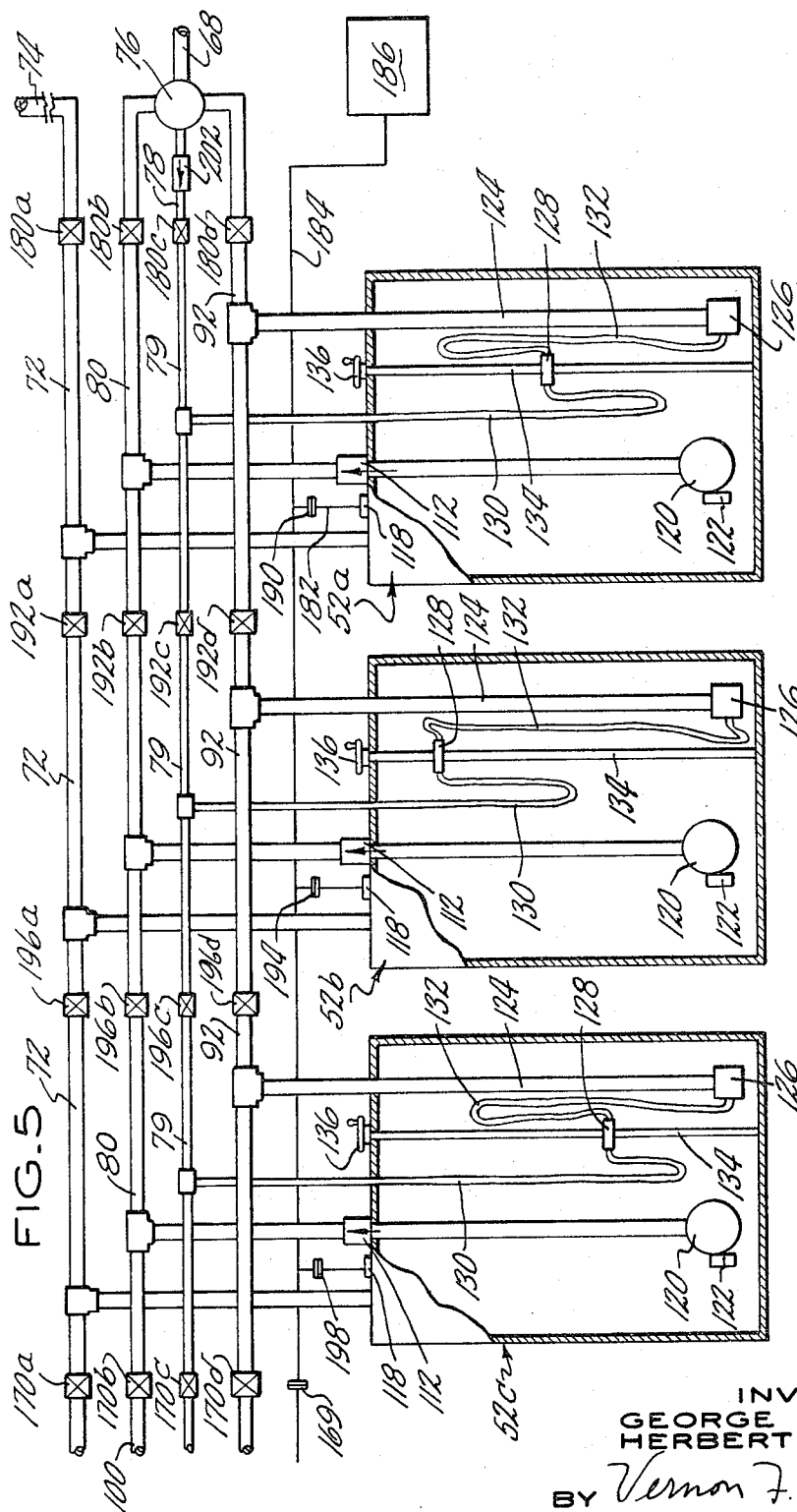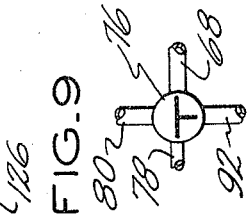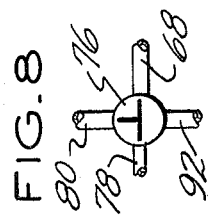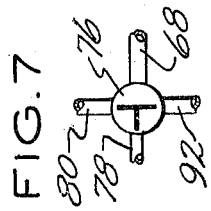
INVENTORS
GEORGE J. PAULIS
HERBERT N. SHOHET
BY Vernon F. Hauschild
ATTORNEY

United States Patent Office 3,383,078
Patented May 14, 1968

3,383,078
AUXILIARY FLUID SYSTEM
Herbert N. Shohet, Norwalk, and George J. Paulis, Trumbull, Conn., assignors to United Aircraft Corporation, East Hartford, Conn., a corporation of Delaware
Filed Dec. 23, 1964, Ser. No. 420,732
14 Claims. (Cl. 244—135)

This invention relates to auxiliary fuel systems and more particularly to systems for increasing the flight range of aircraft.

It is an object of this invention to increase the flight range of aircraft by temporarily installing auxiliary fuel tanks in an aircraft compartment, which auxiliary fuel tanks are preferably of identical size and temporarily attached to the aircraft singly or in groups of any number up to the capacity of the aircraft and are capable of being connected to the aircraft fuel system so as to provide for the reception of fuel in the auxiliary tanks, the transfer of fuel between auxiliary tanks and from any auxiliary tank to the main fuel system, the venting of each auxiliary tank and the pumping out of each auxiliary tank in any combination or in any sequence.

It is an object of this invention to teach an auxiliary fuel system which may be installed and removed in an aircraft with minimum of man hours, tools, or configuration alterations and without sacrificing aircraft performance.

It is still a further object of this invention to teach an auxiliary fuel system in which any number of auxiliary fuel tanks may be used so as to blend compatibly with the passenger or cargo load of the aircraft.

It is still a further object of this invention to teach an auxiliary fuel system which utilizes, but is not limited to, an existing aircraft pressure fueling system to fill the auxiliary fuel tanks and in which each auxiliary tank includes adjustable apparatus to limit the amount of fuel received in each tank so as to control thereby the gross weight and the center of gravity of the aircraft and further wherein each auxiliary tank includes a fuel pump and interconnecting lines or conduits such that the pump may pump fuel from any auxiliary tank into any other auxiliary tank, into the main engine fuel system or overboard to other aircraft, vehicles or fuel tank farm.

It is still a further object of this invention to teach an aircraft range increase system readily adaptable to a variety of different basic aircraft capable of containing one or more auxiliary tanks up to their weight and/or size limitation and which may have, but are not limited to aircraft having existing pressure refueling means.

It is still a further object of this invention to teach an aircraft range increase system including a plurality of auxiliary fuel tanks each of which is identical, self-sufficient, uses electrical power for pumping only, contains its own pumping system, vent plumbing, mounting and fuel level control system and in which all associated lines are flexible and equipped with quick disconnect fittings.

It is still a further object of this invention to teach an auxiliary fuel system in which the fuel pump from any auxiliary tank may be removed and placed in a second auxiliary tank with a minimum of effort.

It is still a further object of this invention to teach an auxiliary system which includes a plurality of identical fuel tanks, which also includes provisions to prevent the improper interconnection between tanks, when installed in any sequence regardless of the direction of installation, by selecting different line sizes for each fuel transfer or venting system.

It is still a further object of this invention to teach an auxiliary fuel system which includes an auxiliary oil system attached thereto which is manually operated to permit the aircraft engines to operate over a longer range.

It is still a further object of this invention to teach an auxiliary fuel system for aircraft including a plurality of identical auxiliary fuel tanks which are of such size and shape that they may be loaded or off-loaded with existing aircraft ground cargo handling systems in full, partly filled or empty condition.

It is still a further object of this invention to teach an auxiliary fluid system in which a plurality of auxiliary tanks could carry a variety of fluids such as water, foodstuff, pourable bulk materials and the like.

It is still a further object of this invention to teach an auxiliary fuel system the tanks of which may be fabricated of non-corrosive materials and may be stored readily when not in use by stacking one on top of another.

Other objects and advantages will be apparent from the specification and claims and from the accompanying drawings which illustrate an embodiment of the invention.

FIG. 2 is a top view of a plurality of auxiliary fuel tanks connected in accordance with the teaching of our invention.

FIG. 3 is an enlarged showing of an auxiliary tank cover to show the self-sufficient equipment associated with each auxiliary tank.

FIG. 4 is a cross sectional showing of the adjustable fuel level control used in each auxiliary tank.

FIG. 5 is a schematic showing of our auxiliary fuel system used for the purpose of describing the fuel system operation.

FIG. 6 is the master selector valve of FIG. 5 in its precheck position.

FIG. 7 is the master selector valve of FIG. 5 in its internal transfer position.

FIG. 8 is the master selector valve of FIG. 5 in its main tank transfer position.

FIG. 9 is the master selector valve of FIG. 5 in its pressure refuel and suction defuel position.

Figure 1:
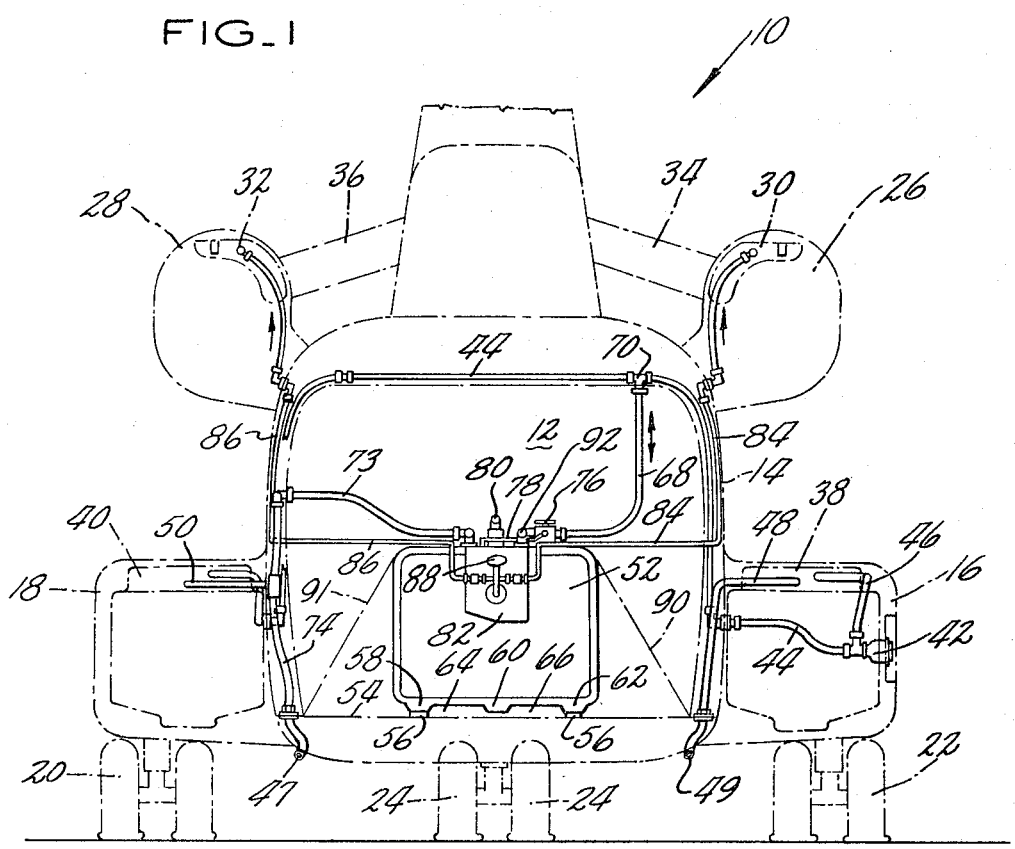
FIG. 1 is a showing of a conventional aircraft such as a helicopter incorporating our auxiliary fuel system.

Referring to FIG. 1 we see aircraft 10, which is illustrated to be a modern helicopter, including passenger or cargo compartment 12 positioned within fuselage 14 and supported through sponsons 16 and 18 by wheels 20 and 22 together with nose wheels 24. Conventional engines (not shown) are mounted in engine pods 26 and 28 and are provided with individual oil tanks 30 and 32. The engines drive concealed shafting in struts 34 and 36, which in turn drive the helicopter rotor and blades (not shown). The port main fuel tank 38 is positioned in port sponson 16 and the starboard main fuel tank 40 is positioned in starboard sponson 18. In the typical example illustrated, pressurized fuel from an external source is introduced to helicopter or aircraft 10 through refueling adapter 42 and passes therefrom into fueling or defueling line 44. A portion of the fuel from line 44 passes into line 46 and thence into the port fuel tank 38. The remainder of the fuel passes through line 44 and into starboard fuel tank 40.

Each main fuel tank such as 38 and 40 vents to the atmosphere at its outlet 47 or 49 in conventional fashion. In the present invention one or more auxiliary fuel tanks 52 are positioned along the deck 54 of compartment 12 and are received preferably on either runners or rollers 56. It will be noted that the bottom of auxiliary fuel tank 52 includes three elongated ridges 58, 60 and 62 with elongated voids 64 and 66 therebetween and running the full length thereof to receive the forks of a conventional fork-lift truck, thereby permitting the easy loading and unloading of auxiliary tank 52. Tank 52 is connected through flexible line 68 and T 70 to the existing main pressure fuel line 44 so that fuel from the main pressure fuel line 44 may enter auxiliary tank 52 through line 68 during fueling or leave tank 52 through lines 68 and 44 during defueling. Tank 52 is also connected by flexible line 73 to aircraft vent line 74 and, hence, is vented overboard at outlet 47. In a fashion to be described hereinafter, selector valve 76 determines the operation of auxiliary tank 52 as it conducts fluid through line 68 and through precheck line 78. When a plurality of auxiliary tanks 52 are used, pumping may take place between the auxiliary tanks through flexible transfer line 80.

Preferably, an auxiliary oil tank 82 is attached to auxiliary tank 52 and connected through lines 84 and 86 to port and starboard engine oil tanks 30 and 32. Crank 88 may be manually operated in conventional fashion to pump oil from auxiliary oil tank 82 to the port and starboard oil tanks 30 and 32. Crank 88 may, for example, through rack and pinion operation, cause a piston to sweep through an oil filled cylinder and thereby accomplish the oil pumping operation. It will be evident that as the range of an aircraft is increased by the addition of auxiliary fuel tanks 52, the total oil consumed by the engines will also be increased and, therefore, an auxiliary oil system may be necessary.

The individual auxiliary fuel tanks 52 are individually temporarily connected to the aircraft compartment 12 by any conventional means such as tie-down lines 90 and 91 which run between the fuel tank 52 and the compartment 12 and may be attached to each in any convenient fashion, for example, by eyelets.

Referring to FIG. 2, we see a top view of a plurality of identical fuel tanks 52a, b and c, which are identical in shape and preferably made of some lightweight non-corrosive material, such as fiberglass, and which may have any selected capacity.

While for the purpose of convenience, three fuel tanks 52a, b and c are shown in FIG. 2, it should be borne in mind that one of the disadvantages of our invention is the flexibility thereof in that any number of auxiliary fuel tanks may be used in this fashion, limited only by the size and carrying capacity of the basic aircraft.

As previously described, pressurized fuel enters refueling adapter 42 in FIG. 2 and passes from line 44 into line 68 and then through selector valve 76 and T 98 into pressure fueling and defueling line 92 and then into each individual tank 52.

Fuel also passes through precheck lines 78 and 79, and in a fashion to be described hereinafter, determines the level to which the fuel may be admitted in each of tanks 52. FIG. 2 also shows that vent lines 72 connect tanks 52 to one another and to the aircraft vent line 74. Through connecting line 73 each auxiliary fuel tank 52 has its own electrically operated pump so that any tank, such as the center tank shown in FIG. 2, may pump the fuel therefrom through a self contained check valve 112 (FIG. 3) main fuel transfer line 80, T 94 and selector valve 76 through lines 68 and 44 to the engine main fuel tanks 38 and 40 shown in FIG. 1. With selector valve 76 properly set, the fuel from any tank, such as the center tank 52b of FIG. 2, may be pumped through the aforementioned check valve and through transfer line 80, T 94, selector valve 76, T 98, line 92, and thence into either or both of the end tanks 52a or c. The settings of level sensors, to be described hereinafter, in the end tanks 52a and 52c determine the percentile of fuel pumped from the center tank 52b and received by either end tank, from 0 to 100%. If it is desired to pump fuel overboard from any or all of the tanks 52a, b or c, flexible line 100 may be added by quick disconnect means to an end of line 80. By proper setting of selector valves 76, any tank, such as the center tank, 52b of FIG. 2, may pump the fuel through its self contained check valve, through transfer line 80, and into the overboard line 100.

Referring to FIG. 3 we see cover plate 102 from one of the auxiliary tanks 52 in greater particularity. All details above cover 102 may be considered external to tank 52 and all below cover 102 internal to tank 52. Vent lines 72 are connected thereto through T 103 and flange 104. Precheck line 79 is connected thereto through T 106. Main fuel transfer line 80 is connected thereto through T 108 and bushing 110, which contains check valve 112 to insure that the flow therethrough will be from the tank 52 to the line 80 and not in the reverse direction. Pressure fueling and defueling line 92 is attached through T 114 and flange 116 to cover 102. Cover plate 102 also includes electrical connection 118 which is used to drive electrical fuel pump 120. It will be noted that by disconnecting T 108 and loosening bushing 110, pump 120 and shaft 121 may be removed from one auxiliary tank and transferred to another auxiliary tank 52, perhaps to replace a malfunctioning pump. Float 122 operates to shut off pump 120 in conventional fashion when fuel tank 52 is empty or nearly so. Fuel pump 120 and float 122 may be of the type shown on page 1177 of Sears Catalogue Fall & Winter 1953, Boston 227. The fuel which enters tank 52 through line 92 passes into tank 52 through shaft 124 and shut-off valve 126, which is actuated in a fashion to be described hereinafter by level sensor 128. Level sensor 128 is connected to precheck line 79 through flexible line 130 and to shut-off valve 126 by flexible line 132. The position or height of level sensor 128 within tank 52 is infinitely adjustable along threaded shaft 134 by the rotation of crank member 136. The position of level sensor 128 is externally indicated by pointer member 138, which is attached to and actuated by crank member 136. Crank member 136 is external of tank 52 and cover 102.

Dip stick 140 includes twistable handle 142 so that it may be secured to flange 144 in cover 102 and also includes float member 146 secured to its lower end so that once twist knob 142 is twisted to release dip stick 140 from flange member 144, float 146 will float to the top of the fuel in tank 52 and thereby indicate the level of the fuel in the tank. Dip stick 140 may be of the type described in greater particularity on page 40 of the June 8, 1959, issue of Design News.

Level sensor 128 and valve 126 are shown in greater particularity in FIG. 4. High pressure fuel from line 130 is provided to nozzle 150 wherefrom it issues as a thin high velocity jet of fuel and thereupon impinges on orifice 152 at the opposite end of housing chamber 151. Line 132 is thereby pressurized and transmits this fluid pressure into chamber 154 of shut-off valve 126 causing piston or diaphragm 156 to compress spring 164 and thereby open valve 160 to permit the fuel from shaft 124 to pass through valve 160 within shut-off valve assembly 126 then through poppet member 162 into auxiliary tank 52. Float 200 will keep the poppet 162 open, provided sufficient fuel exists in the tank to cause it to float. When tank 52 is being thusly filled, and the level of fuel in tank 52 exceeds the level of the open housing 151 of the sensor 128, this fuel intercepts the jet between nozzle 150 and orifice 152. This action cuts off the pressure in line 132 and chamber 154 and permits valve 160 of valve assembly 126 to close, thereby preventing further fuel from entering auxiliary tank 52. The position of level sensor 128 being infinitely adjustable on threaded shaft 134, tank 52 may be filled to any predetermined portion of its capacity.

*Operation*

Referring to the schematic of the auxiliary fuel system shown in FIG. 5, let us consider the operation of this auxiliary fuel system. It should be borne in mind that any number of auxiliary fuel tanks 52 may be used in this system although three are illustrated in FIG. 5 purely for purposes of explanation. Each of the fuel tanks 52 is positioned in compartment 12 of aircraft 10 and connected thereto through tie-down lines 90 and 91 as best shown in FIG. 1. These three fuel tanks in FIG. 5 will be referred to as tanks 52a, 52b and 52c. When tank 52a is so temporarily installed in aircraft 10, quick disconnect joint 180a is used to connect vent line 72 of auxiliary tank 52a to the aircraft fuel tank vent system 74. Quick disconnect joint 180b is used to join fuel transfer line 80 of auxiliary tank 52a to selector valve 76. Quick disconnect joint 180c is used to connect precheck line 79 of tank 52a to precheck line 78 and main selector valve 76. Quick disconnect joint 180d is used to connect pressure fueling line 92 of auxiliary tank 52a to selector valve 76. Electrical line 182 joins electrical connection 118 of tank 52a and more particularly pump 120 thereof to the main electrical bundle 184, which is controlled by cockpit control 186 so that the pilot may start electrical pump 120 in auxiliary tank 52a only, if so desired. With tank 52a so installed and connected it should be borne in mind that our auxiliary fuel system could be complete if tank 52a contained sufficient fuel for the required range of aircraft operation.

With auxiliary tank 52a so installed, the auxiliary fuel system work as follows: When fuel is to be admitted to tank 52a, crank 136 will be rotated to turn screw thread shaft 134 and thereby position level sensor 128 within tank 52a. Level sensor 128 will be positioned to the level to which fuel is to be admitted into tank 52a. With level sensor 128 so positioned, pressurized fuel is introduced through lines 68 and transfer valve 76. Transfer valve 76 is initially positioned as shown in FIG. 9 so that the fuel from line 68 passes through the transfer valve 76 and then through precheck lines 78 and 79, then through line 130, level selector 128 and line 132 to open shut-off valve 126 in the fashion described previously. With the shut-off valve 126 open and with level sensor 128 set at the desired level, tank 52a receives the fuel which is being admitted through pressure fueling line 92. Selector valve 76 may then be turned to the position shown in FIG. 6 to precheck the operation of level sensor 128 and shut-off valve 126. With selector valve so positioned as in FIG. 6, fuel to precheck lines 78 and 79 is cut-off so that shut-off valve 126 should close due to the action of sensor 128. The shut off of fuel through this sensor 128 simulates the action of the sensor previously described in tank filling wherein the fuel jet through the sensor 128 was intercepted by the rising level of fuel in the tank, thereby reducing the pressure to valve 126, resulting in a closing of that valve, and preventing further filling of the tank. A malfunction in either the sensor 128 or shut off valve 126 which would allow fuel to continue to flow into the tank 52a may be detected by an attendant, either audibly by the sound of the tank filling or visually by observance of the rise of floating dip stick 140 of FIG. 3. After shut-off valve 126 and level sensor 128 have been prechecked, selector valve 76 may be reset in its FIG. 9 pressure refuel and suction defuel position so that fuel from pressure line 68 will flow through precheck line 78 to maintain shut-off valve 126 open, and also through pressure fueling line 92 and hollow shaft 124 and shut-off valve 126 into the interior of auxiliary tank 52a. When the level of fuel in tank 52a reaches the position of level sensor 128, shut-off valve 126 will be closed in the fashion previously described in connection with FIG. 4 so that no further fuel will be admitted to tank 52a. With selector valve 76 positioned as shown in FIG. 9, if a suction system were placed on line 68, the fuel from tank 52a would be sucked through open valve 126, shaft 124, line 92 and selector valve 76 into pressure fuel line 68 to thereby remove all fuel from auxiliary tank 52a. Check valve 202 in precheck line 78 will stop air from entering lines 92 and 68 through level sensor 128. This suction defueling operation may take place at any time when aircraft 10 is on the ground. With fuel tank 52a vented as previously described, selector valve 76 may be positioned to the main tank transfer position shown in FIG. 8 so that when the pilot, with electrical connection 190 joining line 182, connection 118, and pump 120 to main electrical bundle 184, actuates cockpit control 186 which actuates electrical pump 120, the fuel from tank 52a will be pumped by pump 120 through check valve 112, main transfer line 80, selector valve 76 and line 68 into the engine main tanks 38 and 40 through lines 44 and 46 shown in FIGS. 1 and 2. A small amount of fuel will flow back into tank 52a through precheck lines 78 and 79, which due to their relatively small size limit the back flow to a very small amount. While selector valve 76 is also positionable to a fourth position shown in FIG. 7 wherein fuel from tank 52a may be transferred to a second auxiliary tank, it will be understood that such would not be done until a second auxiliary tank is installed.

If a second auxiliary tank is desired in the auxiliary fuel system, tank 52b would be placed in aircraft compartment 12 shown in FIG. 1 and electrical connection 194 would be used to connect the main electrical bundle 184 to electrical connection 118 of tank 52b so that the pump 120 of tank 52b may be operated from the cockpit control 186. Quick-disconnect joint 192a connects vent line 72 of tank 52b to vent line 72 to tank 52a and therefore to the aircraft fuel tank vent line 74. Quick disconnect joint 192b is used to connect main fuel transfer line 80 of tank 52b to main fuel transfer line 80 of tank 52a and hence to selector valve 76. Quick disconnect joint 192c is then used to connect precheck line 79 of tank 52b with precheck line 79 of tank 52a and therefore to precheck line 78 and selector valve 76. Quick disconnect joint 192d is used to connect pressure fueling line 92 of auxiliary tank 52b to pressure fueling line 92 of tank 52a and therefore to selector valve 76.

In similar fashion electrical connector 198 and quick disconnect connectors 196a, 196b, 196c and 196d may be used to connect auxiliary tank 52c into the system. In like fashion, electrical connection 169 and quick disconnect joints 170a, 170b and 170c and 170d may be used to add additional tanks to the auxiliary fuel system. The last quick disconnect joint in main fuel transfer line 80 may be connected to an overboard line 100 as previously described.

Quick disconnect joints such as 180a–d; 192a–d; 196a–d and 170a–d may be of the type shown on page 251 of the Nov. 5, 1964, issue of "Machine Design."

It will be evident that with the level selectors 128 selectively positioned in tanks 52a, 52b and 52c to the desired height of fuel in these tanks, with selector valve 76 in the position shown in FIG. 9, pressurized fuel from line 68 will enter precheck lines 79 to open shut-off valves 126, and pressurized fuel from line 68 will also pass through pressure fueling line 92 into each of tanks 52a, 52b and 52c. With selector valve 76 in the position shown in FIG. 9, fuel may be suctioned from the tanks if desired by applying a suction to line 68. For this suction defueling process, valve 126 includes float 200 as shown in FIG. 4 which closes poppet 162 when the fuel level has reached a desired minimum. Closing of this poppet 162 will prevent air from entering the suction lines to cause a loss of suction that would prevent the defueling of the other tanks. When the level of fuel in each tank 52a, 52b and 52c reaches the preselected height of the level sensor 128 therein during the refueling operation, shut-off valve 126 will operate in that auxiliary tank so that no additional fuel can be admitted to the tank. If it is desired to pump fuel from one of the auxiliary tanks such as 52b to the main fuel tanks 38 and 40 of FIG. 1, selector valve 76 will be positioned to its main tank transfer position shown in FIG. 8 and the pilot will start electrical pump 120 in tank 52b. Fuel will accordingly be pumped from tank 52b through check valve 112 thereof and main fuel transfer line 80, and selector valve 76 into pressure fuel line 68 and thereby into the main fuel tanks 38 and 40. When the level of the fuel in tank 52b reaches a preselected minimum, float switch 122 will shut off pump 120 so that no further fuel will be pumped therefrom, thereby preventing pump cavitation and sludging.

If it is now desired to transfer fuel from auxiliary tank 52a into auxiliary tank 52b, selector valve 76 is placed in the internal transfer position shown in FIG. 7 and the pilot starts electrical pump 120 in tank 52a. The fuel from tank 52a then passes through check valve 112 therein and line 80 and selector valve 76 into pressure fueling line 92, shaft 124 and valve 126 into tank 52b.

With the selector valve 76 in the transfer position as shown in FIG. 7, fuel will flow through valve 76 into line 78 and 79 and to level sensors 128 in both tanks. Proper positioning of the height of these sensors will prevent flow of fuel into tank 52a and allow automatic shut-off of fuel into tank 52b. When tank 52b has thus been filled to its desired level, pump 120 in tank 52a may be shut off at control 186. In similar fashion fuel may be pumped from any of the auxiliary tanks into any other of the auxiliary tanks for purpose of cargo distribution or center of gravity control and the like.

While an aircraft fuel system has been used as a means of illustrating the auxiliary fluid system taught herein, it will be evident to those skilled in the art that this auxiliary fluid system is capable of carrying fluids or pourable bulk other than fuel and may be used in installations other than aircraft.

It is to be understood that the invention is not limited to the specific embodiment herein illustrated and described but may be used in other ways without departure from its spirit as defined by the following claims.

We claim:

1. In a fuel system, a main fuel tank, a vent system for said main tank, first and second auxiliary fuel tanks each including means to receive fuel from an external source, and further including variable means to limit the amount of fuel received thereby, and still further including means to pump fuel therefrom to said main tank, and still further including means to pump fuel therefrom to the other of said auxiliary tanks, means connecting said auxiliary tanks to said main tank vent system to thereby vent said auxiliary tanks.

2. Apparatus according to claim 1 wherein said limiting means includes infinitely positionable means responsive to fuel level to block said fuel receiving means.

3. In a flight vehicle, at least one main fuel tank having a vent system, fuel receiving means adapted to receive fuel from an external source and conduct fuel to said main tank, at least one storage compartment, a plurality of identical auxiliary fuel tanks positioned in and temporarily connected to said compartment, means connecting said auxiliary tanks together and to said fuel receiving means so that fuel may be received into each of said auxiliary tanks from said fuel receiving means, variable positionable means in each of said auxiliary tanks to determine the amount of fuel to be pump thereinto, means to pump fuel from each of said auxiliary tanks into each other auxiliary tank, means to pump fuel from each of said auxiliary tanks to said main tank, means to pump fuel from each of said auxiliary tanks overboard, and means connecting each of said auxiliary tanks to said main tank vent system thereby venting each of said auxiliary tanks.

4. Apparatus according to claim 3 wherein said fuel limiting means includes selectively positionable means in each of said auxiliary fuel tanks and being responsive to fuel level and connected to shut off the flow of fuel from said fuel receiving means into said auxiliary tank when said fuel reaches the level of said preselected position.

5. An aircraft, a permanent main fuel tank installed in said aircraft, a fuel tank vent system connected to said main fuel tank, fuel receiving means in said aircraft adapted to receive pressurized fuel from an external source and including ducting leading to said main fuel tank to transport pressurized fuel to the main fuel tank, a plurality of auxiliary fuel tanks temporarily secured in said aircraft, means to connect said auxiliary tanks to said main fuel tank venting system, first means to connect said auxiliary tanks to said main fuel tank fuel receiving means, variably adjustable means in each of said auxiliary fuel tanks to limit the amount of fuel which may be received therein, pump means located in each of said auxiliary fuel tanks to discharge fuel therefrom, quick connect-disconnect means interconnecting said auxiliary fuel tanks so that said pumps may pump fuel from one of said auxiliary fuel tanks into any other of said auxiliary fuel tanks.

6. Apparatus according to claim 5 wherein said fuel limiting means includes a normally closed shut-off valve in said receiving means and an infinitely positionable level sensor positioned in said auxiliary tank, and further includes a precheck line connected to said fuel receiving means to establish pressurized flow through said level sensor to open said shut-off valve and so that said pressurized flow is disrupted when the height of fuel in said auxiliary tank reaches the level of said level sensor thereby permitting said shut-off valve to close.

7. Apparatus according to claim 6 and including a selector valve connecting said precheck line to said fuel receiving means, connecting said first means to said fuel receiving means and connecting said tank interconnecting means to said fuel receiving means, said selector valve being positionable to a first position wherein pressurized fuel may enter said precheck line to open said shut-off valve and wherein pressurized fuel may pass through said first means into said auxiliary fuel tanks and wherein fuel may be suctioned off from said auxiliary fuel tanks to said fuel receiving system, said selector valve being positionable to a second position wherein fuel flow to said precheck line is discontinued to precheck said level sensor and shut-off valve, said selector valve being positionable to a third position wherein fuel may be transferred by said pump from one auxiliary tank into another auxiliary tank, said selector valve being positionable to a fourth position wherein fuel from any of said auxiliary tanks may be pumped by said pump to said main fuel tank.

8. In an aircraft, a permanently installed main fuel tank, a vent system for said main fuel tank, first conduit means connecting said main fuel tank to a pressurized fuel receiving adapter at said aircraft, a selector valve in said first conduit means, a plurality of auxiliary fuel tanks temporarily secured in position in said aircraft, each of said auxiliary tanks including a scavenge pump, an adjustable fuel level sensor and a pressure responsive shut-off valve, second conduit means connecting said selector valve to each of said level selectors and said shut-off valve, third conduit means connecting said selector valve to each of said auxiliary tanks, fourth conduit means connecting each of said scavenge pumps to said selector valve, means to connect each of said auxiliary tanks to said main tank vent system, said selector valve being positionable to a first position wherein pressurized fuel received in said first conduit system will be directed into said second conduit system to open said shut-off valves, said selector valve being positionable to a second position wherein fuel from said first conduit system will pass through said third conduit system and into each of said auxiliary tanks to the level of said adjustable level sensor, said selector valve being positionable to a third position wherein fuel from any of said auxiliary tanks may be pumped by the scavenge pump therein through said fourth conduit system and said selector valve to said first conduit system and hence said main fuel tank, said selector valve being positionable to a fourth position wherein fuel from any of said auxiliary tanks may be pumped by said scavenge pump therein through said fourth conduit system, then through said selector valve then through said third conduit system into any other of said auxiliary tanks.

9. A fuel tank cover plate having attached thereto tank vent means, a fuel receiving line including a shut-off valve, a fuel scavenge line including a pump, variably positionable fuel level means including fluid receiving means to open said shut-off valve.

10. In an aircraft, a fuel system, a permanent main fuel tank installed in said aircraft, a vent system for said main tank, a plurality of identical auxiliary fuel tanks positioned in and temporarily connected to said aircraft and each including means to receive fuel from an external source, and further including variable means to limit the amount of fuel received thereby, and still further including means to pump fuel therefrom to said main tank, and still further including means to pump fuel therefrom to any other of said auxiliary tanks, and means to vent said auxiliary tanks.

11. In an aircraft, a fuselage forming a compartment, a main fuel tank in said compartment, an auxiliary fuel tank in said compartment and comprising means adapted to receive fuel from an external source, variable means located in said auxiliary fuel tank and operable to limit the amount of fuel received in said auxiliary fuel tank, means to discharge fuel from said auxiliary fuel tank to said main fuel tank, a liquid lubricant tank located within said fuselage, an auxiliary liquid lubricant tank attached to said auxiliary fuel tank, and manually operable means to pump liquid lubricant from said auxiliary liquid lubricant tank to said main liquid lubricant tank.

12. An aircraft having a fuel system including,
 (a) a permanent main fuel tank,
 (b) a vent system for said main tank,
 (c) a plurality of auxiliary fuel tanks positioned in and temporarily connected to said aircraft and each including first means to receive fuel from an external source,
 (d) and each auxiliary fuel tank further including variable second means to limit the amount of fuel received by said auxiliary tank,
 (e) and each auxiliary fuel tank still further including third means including a fuel pump to transfer fuel therefrom to said main tank,
 (f) means to vent said auxiliary tanks,
 (g) a selector valve connecting said main and auxiliary tanks and being positionable to activate said first, second or third means,
 (h) and quick connect-disconnect means interconnecting said auxiliary fuel tanks so that said fuel pumps may pump fuel from one of said auxiliary fuel tanks directly into any other of said auxiliary fuel tanks.

13. In a fuel system, a permanent main fuel tank, a vent system for said main tank, a plurality of identical auxiliary fuel tanks temporarily connected to said main fuel tank and each including means to receive fuel from an external source, and further including variable means to limit the amount of fuel received thereby, and still further including means to pump fuel therefrom to said main tank, and still further including means to pump fuel therefrom to any other of said auxiliary tanks, and means to vent said auxiliary tanks.

14. A fuel system including,
 (a) a permanent main fuel tank,
 (b) a vent system for said main tank,
 (c) a plurality of auxiliary fuel tanks temporarily connected to said main fuel tank and each including first means to receive fuel from an external source,
 (d) and each auxiliary fuel tank further including variable second means to limit the amount of fuel received by said auxiliary tank,
 (e) and each auxiliary fuel tank still further including third means including a fuel pump to transfer fuel therefrom to said main tank,
 (f) means to vent said auxiliary tanks,
 (g) a selector valve connecting said main and auxiliary tanks and being positionable to activate said first, second or third means,
 (h) an quick connect-disconnect means interconnecting said auxiliary fuel tanks so that said fuel pumps may pump fuel from one of said auxiliary fuel tanks directly into any other of said auxiliary fuel tanks.

References Cited
UNITED STATES PATENTS

| | | | |
|---|---|---|---|
| 1,776,877 | 9/1930 | Yonkese. | |
| 2,406,854 | 9/1946 | Samiran. | |
| 2,860,651 | 11/1958 | Davies | 158—36 XR |
| 3,115,114 | 12/1963 | Rapplean et al. | 158—36 XR |
| 3,279,522 | 10/1966 | Norris et al. | |
| 2,217,947 | 10/1940 | Frey | 137—426 |
| 2,516,150 | 7/1950 | Samiran | 137—551 X |
| 2,703,138 | 3/1955 | Amon | 158—36 |
| 2,704,117 | 3/1955 | Samiran | 158—36 |
| 2,834,211 | 5/1958 | Samaritano | 73—322 |
| 3,021,788 | 2/1962 | Kaatz | 103—25 |

HENRY T. KLINKSIEK, *Primary Examiner.*

M. CARY NELSON, *Examiner.*

W. JOHNSON, *Assistant Examiner.*